Patented May 5, 1936

2,039,722

UNITED STATES PATENT OFFICE 2,039,722

PROCESS FOR THE PREPARATION OF ORGANIC ACIDS

Alfred T. Larson, Wilmington, Del., assignor to E. I. du Pont de Nemours & Company, Wilmington, Del., a corporation of Delaware No Drawing. Application October 25, 1932, Serial No. 639,481

7 Claims. (Cl. 260—116)

This invention relates to a process for the formation of organic compounds and particularly to the preparation of monocarboxylic acids by the interaction of aliphatic alcohols and carbon monoxide in the presence of a catalyst.

It is known that organic acids and esters can be prepared by the interaction, in the vapor or liquid phase, of organic compounds with the oxides of carbon. For example, it has been shown that by the condensation of methyl alcohol with carbon monoxide in the presence of a suitable catalyst, acetic acid, methyl acetate, and methyl formate may be prepared in proportions which are governed by the particular operating conditions.

An object of this invention is to provide improvements in processes for the preparation of higher molecular weight organic compounds thru the introduction of carbon monoxide into the lower molecular weight organic compounds. A further object of this invention is to provide a process for the preparation of monocarboxylic acids by the condensation of an aliphatic alcohol with a carbon oxide in the presence of a catalyst. Another object of this invention is to provide a process for the preparation of acids having the structural formula: $C_nH_{2n+1}COOH$—from alcohols having the structural formula: $C_nH_{2n+1}OH$—by subjecting the alcohols to the action of the carbon monoxide in the presence of a halogenated aliphatic or aromatic hydrocarbon such as propyl chloride, benzyl chloride, etc. with or without the presence of an absorbent material such as pumice, silica gel, active carbon, etc. Other objects will hereinafter appear.

The above objects can be realized by passing a vaporized aliphatic monohydroxy alcohol, carbon monoxide, and a halogenated hydrocarbon, under suitable pressure and temperature conditions, over active carbon or more particularly over activated charcoal. The products resulting from such a reaction will contain generally a mixture of, among other compounds, aliphatic carboxylic acids some of which have a greater, some a lesser, number of carbon atoms than are present in the alcohol treated,—an aliphatic acid containing one more carbon atom than the alcohol, usually, predominating.

The halogenated hydrocarbons which are suitable for activating the reaction include the halides of methane,—that is the mono-, di-, and tri-chlorides, bromides, or iodides of methane, carbon tetra-halides being included as, for example, carbon tetrachloride; the halogenated derivatives of the higher hydrocarbons and including more particularly the ethyl halides, the normal and iso-propyl halides, the butyl halides, including such compounds as the 1-iodo and 2-iodo-butane, and the 2-methyl-ido- and 2-methyl-2-iodo-propane as well as the other halides of these compounds; the ethylene, the ethylidine and propylene halides; tri-chlor-hydrin, perchloroethane, and the unsaturated halogenated hydrocarbons, more particularly the allyl chlorides and bromides, and similar halides such as vinyl halide, alpha-halogenated propylene, trichlorethylene, acetylene tetrachloride, and homologous compounds. Any of the halogenated hydrocarbons, whether saturated or unsaturated, are suitable as catalysts for this reaction particularly when used in conjunction with a form of active carbon.

The alcohol-carbon monoxide reaction which can be accelerated by the above described catalysts may be expressed as follows:

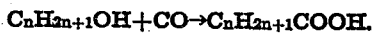

$$C_nH_{2n+1}OH + CO \rightarrow C_nH_{2n+1}COOH.$$

In accordance with the particular operating conditions, it will be found that, in some instances, the acid may not be formed directly in the free state, but may be produced as the ester of the alcohol. The alcohols used may be replaced, if desired, wholly or partly by the corresponding alkyl ethers of the alcohols, such as dimethyl ether, diethyl ether, or the mixed alkyl ethers, the alkyl esters, the alkyl amines, or the alkyl halides. Experts in this art know that it is advantageous, altho not essential, to have water vapor present during the methanol-carbon monoxide to acetic acid reaction. This is true also when the reaction is conducted with compounds which decompose to give the alcohol and is especially advantageous when the compound is such that it forms the alcohol by hydrolysis.

The synthesis can generally be efficiently carried out under the following operating conditions. The pressure may vary from approximately 25 atmospheres to 900 atmospheres or higher with the preferable operating range in the neighborhood of 350—700 atmospheres. These pressures do not differ materially from those used when other types of catalysts are employed for this synthesis nor do the temperatures vary appreciably from those already known for reactions of this type. For example, the process can be suitably carried out, with our catalyst, at temperatures of between 200—400° C., but still higher or lower temperatures may also be used in some cases, the speed of the reaction being increased, as would be expected, by the use of higher temperatures.

The carbon monoxide used may be obtained from various commercial sources, such, for example, as from water gas, producer gas, coke oven gas, etc., but to obtain products of the highest degree of purity it is preferable to remove from such commercial gases the objectionable constituents such as sulfur compounds, metal carbonyls, etc.

The presence of inert gases in the alcohol-carbon monoxide mixture is sometimes desirable. Nitrogen, for instance, has little deleterious effect on the reaction or yield and, in fact, may be advantageously used in order to aid in the temperature control and to prevent too great a conversion of the alcohols and carbon monoxide on one pass through the conversion apparatus. Other strictly inert gases usually act similarly. It is, of course, understood that instead of introducing methanol itself into the reaction chamber substances or mixtures of substances which decompose by hydrolyzing, for example, to form alcohols or which decompose to form esters or ethers may be employed, but generally I prefer to introduce methanol directly into the gas stream.

My process can be conveniently carried out by passing purified carbon monoxide into aqueous methanol maintained at such a temperature that the issuing gases will have the requisite proportion of methanol, carbon monoxide, and a portion of the desired water vapor. The halide may, if water miscible, be dissolved in water which may be injected into the system to give the desired amount of catalyst and total water vapor. Or alternatively such halides may be dissolved in aqueous methanol and the resulting solution injected into the carbon monoxide stream prior to the reaction. I have found that a geaseous composition, containing an excess of carbon monoxide over the methanol vapor, will give a good yield of acetic acid and its ester on one pass thru a converter, the temperature of the reaction chamber being maintained at approximately 375° C. and the pressure held in the neighborhood of 700 atmospheres.

Not only can methanol be catalyzed in the presence of carbon monoxide and my catalyst to acetic acid, or methyl acetate, but the higher alcohols, such as ethyl alcohol, propyl alcohol, butyl alcohol, and even the higher molecular weight alcohols, such, for example, as hexyl alcohol or octyl alcohol, may be similarly converted into an acid having correspondingly one more carbon atom than the alcohol treated. In fact, my process and catalyst may be employed with any of the monohydric alcohols, providing these alcohols volatilize without decomposition under the conditions existing during the reaction. When converting the higher aliphatic alcohols, some of which are not water soluble, and particularly if water is desired in the reaction, it is preferable, generally, to introduce the alcohol and water into the carbon monoxide as a vapor or spray. Any other suitable procedure may be employed, however, for intimately commingling the vapors of the alcohol and water with the oxide of carbon. When preparing products from the higher molecular weight compounds I may utilize in lieu of the alcohols, the ethers, amines, halides, or esters thereof, the use of which will result in a good conversion with generally some slight modification in the ratio of acid to other products obtained.

I will now describe a specific embodiment of our process but it will be understood that the details therein given and the compounds employed, either as reactants or catalysts, in no way restrict the scope of this invention, but merely illustrate one manner in which my process may be carried out A gaseous mixture, containing 85% carbon monoxide, and 5% each of methanol, water vapor, and hydrogen, is passed together with approximately 0.125% carbon tetrachloride over activated charcoal which is disposed in a conversion chamber suitable for the carrying out of gaseous exothermic reactions. The reaction is conducted at a temperature of approximately 325° C. and a pressure of approximately 700 atmospheres. Upon condensation of the products of the reaction a good yield of acetic acid is obtained together with a small amount of other aliphatic acids.

The apparatus, which may be employed for conducting these reactions, may be of any conventional type and preferably one in which the temperature of the exothermic reaction can be readily controlled at the optimum value. Owing to the corrosive action of acetic acid, the interior of the converter and apparatus leading therefrom should preferably be protected. This may be accomplished by using glass or glass-lined apparatus or by plating the inner surfaces of the apparatus with chromium or silver, or using for the construction of this equipment acid-resisting alloy steels containing, for example, molybdenum, cobalt, tungsten, chromium, manganese or nickel.

From a consideration of the above specification it will be realized that any process in which a carbon oxide is combined with an organic compound giving a product containing an aliphatic acid, in which monohydric alcohols are converted to monocarboxylic acids, will come within the scope of this invention when such reactions are accelerated in the presence of a halogenated hydrocarbon and active carbon.

I claim:
1. A process for the preparation of oxygenated aliphatic organic compounds which comprises contacting a compound selected from the group consisting of a saturated aliphatic alcohol, which is not appreciably decomposed when vaporized, and a compound which gives the saturated aliphatic alcohol upon hydrolysis and carbon monoxide with carbon tetrachloride.

2. A process for the preparation of oxygenated aliphatic organic compounds which comprises contacting a compound selected from the group consisting of a saturated aliphatic alcohol, which is not appreciably decomposed when vaporized, and a compound which gives the saturated aliphatic alcohol upon hydrolysis and carbon monoxide with carbon tetrachloride and activated charcoal.

3. A process for the preparation of acetic acid which comprises contacting methanol, carbon monoxide, and carbon tetrachloride with activated charcoal.

4. A process for the preparation of acetic acid which comprises passing methanol, carbon monoxide, and carbon tetrachloride at an elevated temperature and pressure over charcoal.

5. A process for the preparation of propionic acid which comprises contacting ethyl alcohol, carbon monoxide, and carbon tetrachloride with activated charcoal.

6. A process for the preparation of butyric acid which comprises contacting proyl alcohol, carbon monoxide and carbon tetrachloride with activated charcoal.

7. A process for the preparation of acetic acid which comprises reacting a gaseous mixture containing in approximately the precentages given, 85% carbon monoxide, 5% methanol, 5% water vapor, and 5% hydrogen, in the presence of 0.125% carbon tetrachloride and activated charcoal, the reaction being conducted at a temperature and pressure of approximately 325° C. and 700 atmospheres respectively.

ALFRED T. LARSON.